United States Patent
Hatori

(10) Patent No.: US 8,155,822 B2
(45) Date of Patent: Apr. 10, 2012

(54) VEHICULAR ELECTRONIC CONTROL APPARATUS AND CONTROL SPECIFICATION SETTING METHOD FOR SAME

(75) Inventor: Tsutomu Hatori, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 1195 days.

(21) Appl. No.: 11/933,523

(22) Filed: Nov. 1, 2007

(65) Prior Publication Data
US 2008/0161991 A1 Jul. 3, 2008

(30) Foreign Application Priority Data
Nov. 2, 2006 (JP) .................................. 2006-299530

(51) Int. Cl.
*G01M 17/00* (2006.01)

(52) U.S. Cl. ............................................ 701/31; 701/32

(58) Field of Classification Search ....................... 701/31
See application file for complete search history.

(56) References Cited

U.S. PATENT DOCUMENTS

| | | | | |
|---|---|---|---|---|
| 4,404,639 A * | 9/1983 | McGuire et al. | ................ | 701/35 |
| 5,012,414 A * | 4/1991 | Ishii et al. | ................ | 701/29 |
| 5,023,791 A * | 6/1991 | Herzberg et al. | ................ | 701/35 |
| 6,560,516 B1 * | 5/2003 | Baird et al. | ................ | 701/23 |
| 7,039,511 B1 * | 5/2006 | Kreuz et al. | ................ | 701/36 |
| 7,149,206 B2 * | 12/2006 | Pruzan et al. | ................ | 370/349 |
| 2001/0007086 A1 * | 7/2001 | Rogers et al. | ................ | 701/33 |
| 2002/0091471 A1 * | 7/2002 | Suzuki | ................ | 701/29 |
| 2005/0228556 A1 * | 10/2005 | Kojima | ................ | 701/29 |
| 2006/0271255 A1 * | 11/2006 | Stott et al. | ................ | 701/29 |

FOREIGN PATENT DOCUMENTS

| | | | |
|---|---|---|---|
| JP | 4-92734 A | 3/1992 |
| JP | 8-237772 A | 9/1996 |

\* cited by examiner

*Primary Examiner* — Shelley Chen
(74) *Attorney, Agent, or Firm* — Crowell & Moring LLP

(57) ABSTRACT

A vehicular electronic control apparatus is manufactured with at least a portion of control data is omitted, while permitting control data that corresponds to a specific specification to be set afterwards. The control apparatus includes a self-diagnosing function and an associated means for transmitting a diagnosis to the outside. A diagnosis indicating an occurrence of an abnormality which is attributable to the circumstance that the control data corresponding to the specific specification has not yet been set, is prevented from being transmitted to the outside.

20 Claims, 3 Drawing Sheets

VEHICULAR ELECTRONIC CONTROL APPARATUS AND CONTROL SPECIFICATION SETTING METHOD FOR SAME

BACKGROUND OF THE INVENTION

1. Field of the Invention

The present invention relates to a vehicular electronic control apparatus with at least a portion of control data therefor remaining unspecified when the process for manufacturing thereof is finished, and permitting control data corresponding to a specific specification to be specified at a later stage. Further, the invention relates to a method for setting a control specification for the vehicular electronic control apparatus.

2. Description of the Related Art

Japanese Laid-open (Kokai) Patent Application Publication H04 (1992)-092734 discloses a vehicular electronic control apparatus in which a plurality of control specifications are previously stored, and one of the control specifications is selected to execute the control.

Japanese Laid-open (Kokai) Patent Application Publication No. H08 (1996)-237772 discloses a technique in which a plurality of electronic control devices mounted on a vehicle mutually diagnose failures, and if a first electronic control device which sends data is failed, a second electronic control device which receives the data carries out control by using a default value.

In the case of a vehicular electronic control apparatus of which the manufacture is finished in a state where at least a portion of control data is unspecified during the production of the electronic control apparatus, so that information of a specification is taken therein afterwards from an outside to determine the control specification, if the power is turned ON to carry out taking-in of the specification information, a normal control operation is not yet carried out because the control specification is not determined.

Hence, when the electronic control apparatus includes a self-diagnosing means and an associated means for transmitting the result of self-diagnosis done by the self-diagnosing means to the outside, since the normal control operation does not take place, the self-diagnosing means will determine that a condition is abnormal due to its self-diagnosis operation, and such an abnormality determination result will necessarily be outputted by the associated transmitting means to the outside.

Nevertheless, under a condition such that the control specification has not yet established, determination of occurrence of any abnormal state should not be made by the self-diagnosis operation, and therefore if any abnormality determination result is outputted to the outside, an unfavorable problem may occur such that an erroneous result of the self-diagnosis is stored and unnecessary control operation may start, based on the erroneous result of the diagnosis.

SUMMARY OF THE INVENTION

Therefore, it is an object of the present invention to positively avoid a case where either any erroneous result of diagnosis is stored or else unnecessary control operation is carried out based on such an erroneous result of diagnosis under a condition that a vehicular electronic control apparatus has not yet been supplied with information for specifying a control specification.

To achieve the above object, according to the present invention, in a vehicular electronic control apparatus which is finished in the manufacturing process thereof under a condition such that at least a portion of control data is not specified during production of the electronic control apparatus while permitting control data that correspond to a specific specification to be set afterward, and which includes self-diagnosing means and an associated means for transmitting a diagnosis result obtained by the self-diagnosing means to an outside, a novel technique is provided in which a diagnosis result indicating an occurrence of any abnormality due to a reason that the control data corresponding to the specific specification has not yet been set, is prevented from being transmitted to the outside.

The other objects and features of this invention will become understood from the following description with reference to the accompanying drawings.

DESCRIPTION OF THE PREFERRED EMBODIMENTS

Figure 1:
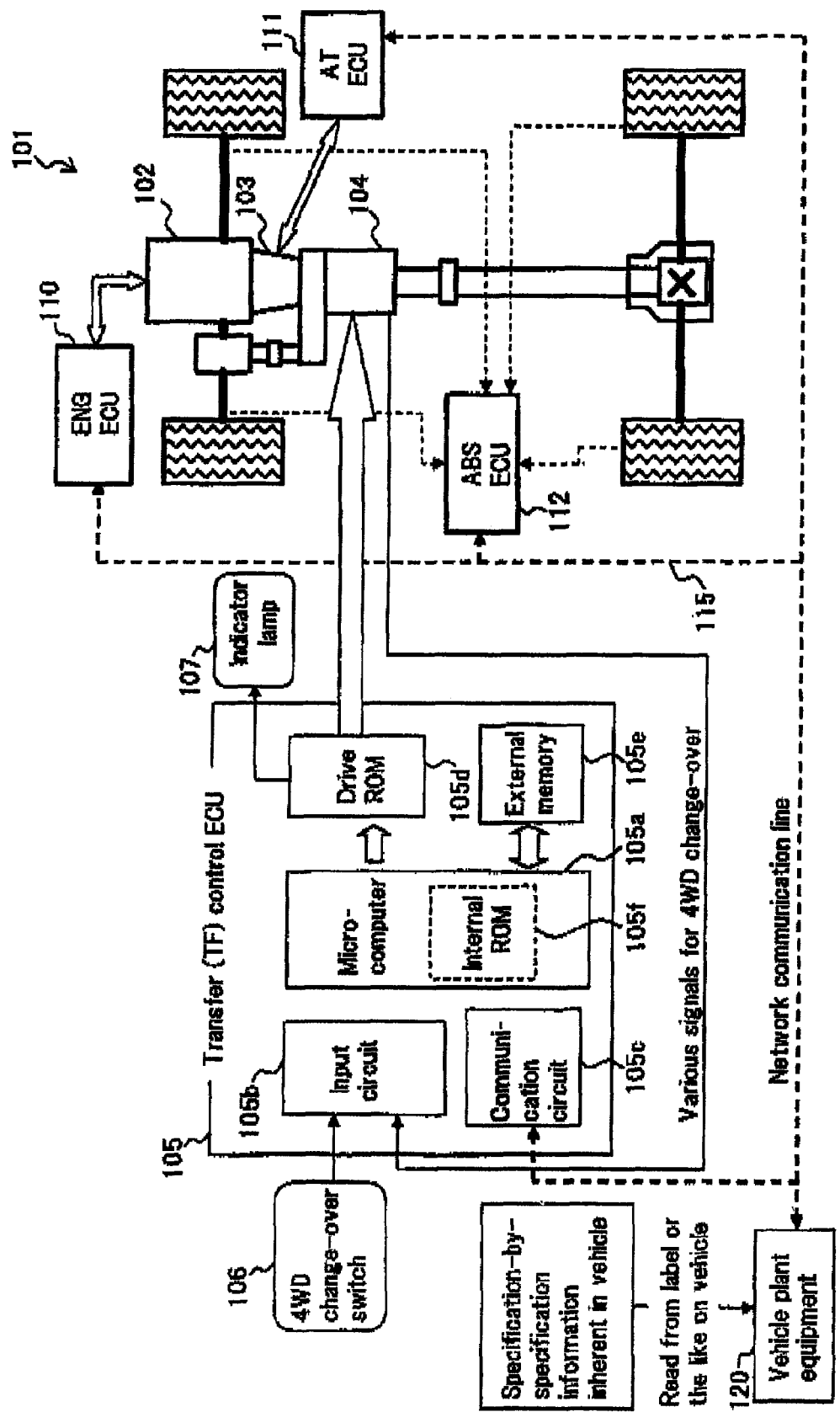
FIG. 1 is a diagram showing a vehicular control system according to an embodiment of the present invention.

FIG. 1 shows a vehicular electronic control apparatus according to an embodiment of the present invention.

An engine (internal combustion engine) 102 is mounted in an automobile 101 shown in FIG. 1. Power taken out from engine 102 is input to a transfer 104 through an automatic transmission 103, and the power is distributed to front and rear axles by transfer 104.

Transfer 104 is a device which varies a distribution of power to the front and rear axles by an electronic control hydraulic multiple disk clutch.

Transfer 104 is controlled by an electronic control unit (TF-ECU, hereinafter) 105 for controlling the transfer.

TF-ECU 105 includes a microcomputer 105a, an input circuit 105b, a communication circuit 105c, a drive circuit 105d and an external memory 105e.

In microcomputer 105a, a ROM (mask ROM) 105f is incorporated. A plurality of control data sets (a control program, a control constant and the like) which correspond to a plurality of specifications of a vehicle are previously stored in ROM 105f.

The vehicular specifications include presence or absence of an antilock brake system (ABS, hereinafter), difference between an automatic transmission (AT) and a manual transmission (MT), and difference in output characteristics of engine 102.

Since requirement of the power distribution characteristics is varied depending upon the difference in specification, control data suitable for a case where there is the ABS and AT is used, control data suitable for a case where there is no ABS and MT is used, and the like are previously stored in ROM 105f.

Information indicating which control data set out of the plurality of control data sets is actually used, in other words, information indicating that the subject vehicle corresponds to which specification, is written into external memory 105e after TF-ECU 105 is mounted in the vehicle in the factory and the specification is specified.

Microcomputer 105a selects control data corresponding to information written into external memory 105e, and executes the control using the selected control data, thereby controlling the power distribution in transfer 104.

Figure 2:
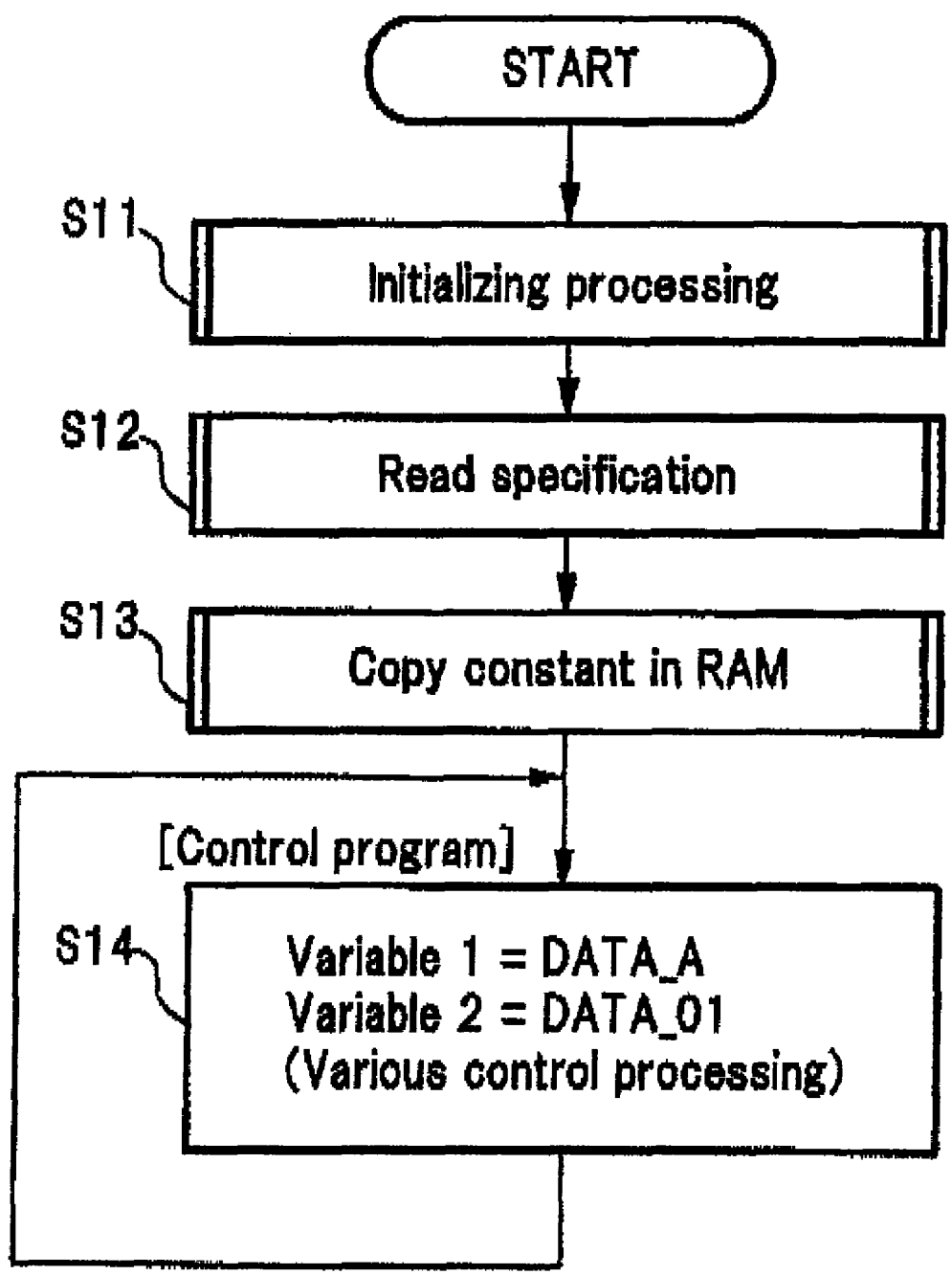
FIG. 2 is a flowchart showing a process of selecting control data according to the embodiment of the invention.

Specifically, control data is selected based on the information written in external memory 105e as shown in a flowchart in FIG. 2.

Following a turning ON of power, initializing processing is carried out (step S11) and then, specification information written in external memory 105e is read (step S12).

When the specification information is read, control data corresponding to the read specification information is read from control data sets which are previously stored in ROM 105f on a specification-by-specification basis, and the read control data is copied in a RAM (step S13), and control is executed using the control data which is copied in the RAM (step S14).

The memory in which the specification information is written may be an electrically rewritable memory, and may be flash ROM incorporated in microcomputer 105a.

As described above, a plurality of control data sets corresponding to the plurality of specifications are previously stored and control data which is to be actually executed in accordance with a specification of a subject vehicle is selected. Therefore, as compared with a case in which different TF-ECUs 105 are prepared for a plurality of different specifications and a TF-ECU 105 to be mounted is selected for the subject vehicle, it is possible to reduce the manufacturing costs of TF-ECU 105 and to make it easy to manage parts.

Input circuit 105b is provided for reading, into microcomputer 105a, a signal of a 4WD change over switch 106, and a signal from a sensor which detects a state (oil temperature, operation pressure, line pressure and the like) of transfer 104.

4WD change-over switch 106 is a switch through which a driver freely selects any one of a 2WD mode, an AUTO mode and a LOCK mode.

The 2WD mode is a mode fixed to rear wheels driving, the AUTO mode is a mode for automatically adjusting power distribution to front wheels in accordance with slip of the rear wheels from 0% to 50% (rear-wheels-drive to four-wheels-drive), and the LOCK mode is a mode fixed to a direct-coupled four-wheels-drive (power distribution of 50:50).

Drive circuit 105d outputs a drive signal to a solenoid which controls operation pressure applied to the electronic control hydraulic multiple disk clutch of transfer 104 and to a transfer motor which drives an oil sub-pump of transfer 104, and outputs a drive signal to an indicator lamp 107 (warning means) provided on an instrument panel or the like of the vehicle.

In addition to TF-ECU 105, the following units are provided in the vehicle of the present embodiment, i.e., an engine-controlling electronic control unit 110 (ENG-ECU, hereinafter) for controlling engine 102, an AT-controlling electronic control unit (AT-ECU, hereinafter) 111 for controlling automatic transmission 103, and an ABS-controlling electronic control unit (ABS-ECU, hereinafter) 112 for controlling the ABS.

ENG-ECU 110 controls a fuel injection amount and a fuel injection timing of a fuel injection valve provided in engine 102, and controls ignition timing by an ignition plug provided in engine 102.

AT-ECU 111 controls a shift solenoid, thereby controlling a gear shifting operation in automatic transmission 103.

ABS-ECU 112 controls the operation pressure of a brake to prevent wheels from locking at the time of braking.

Each of ENG-ECU 110, AT-ECU 111 and ABS-ECU 112, as well as TF-ECU 105, includes a microcomputer.

The four electronic control units, i.e., TF-ECU 105, ENG-ECU 110, AT-ECU 111 and ABS-ECU 112 are connected to each other through a network 115. These electronic control units conduct communication with each other through network 115, and commoditize information and mutually diagnose failure from the communication information.

Data for specifying a specification is written into external memory 105e of TF-ECU 105 through a vehicle plant equipment 120 connected to network 115.

Vehicle plant equipment 120 obtains specification information of a subject vehicle by reading an identification label, for example, attached to the vehicle, and instructs microcomputer 105a of TF-ECU 105 to write the specification information into external memory 105e.

The specification information is written into external memory 105e of TF-ECU 105 after all of the electronic control units including TF-ECU 105 are mounted in the vehicle and power is turned ON in the entire control system.

However, at the instant when the power is turned ON, data for specifying a specification has not yet been written in external memory 105e and thus, TF-ECU 105 can not execute control of transfer 104.

When no control operation is executed by TF-ECU 105, normal communication processing is not conducted among electronic control units 110, 111 and 112 or TF-ECU 105 does not output a signal indicative of an implementation state of control to network 115. Then, other electronic control units 110, 111 and 112 determine the control abnormality in TF-ECU 105, and store the determination result. When TF-ECU 105 has a self-diagnosis function, it might diagnose that TF-ECU 105 is failed because the control is not executed.

However, in the above case, the reason why the control of TF-ECU 105 is not executed is that data for specifying a specification is not written, and thus, TF-ECU 105 is not actually failed. However, when other electronic control units 110, 111 and 112 determine that TF-ECU 105 is failed and/or when the self-diagnosis of TF-ECU 105 determines a failure thereof, an erroneous diagnosis results may be stored.

Figure 3:
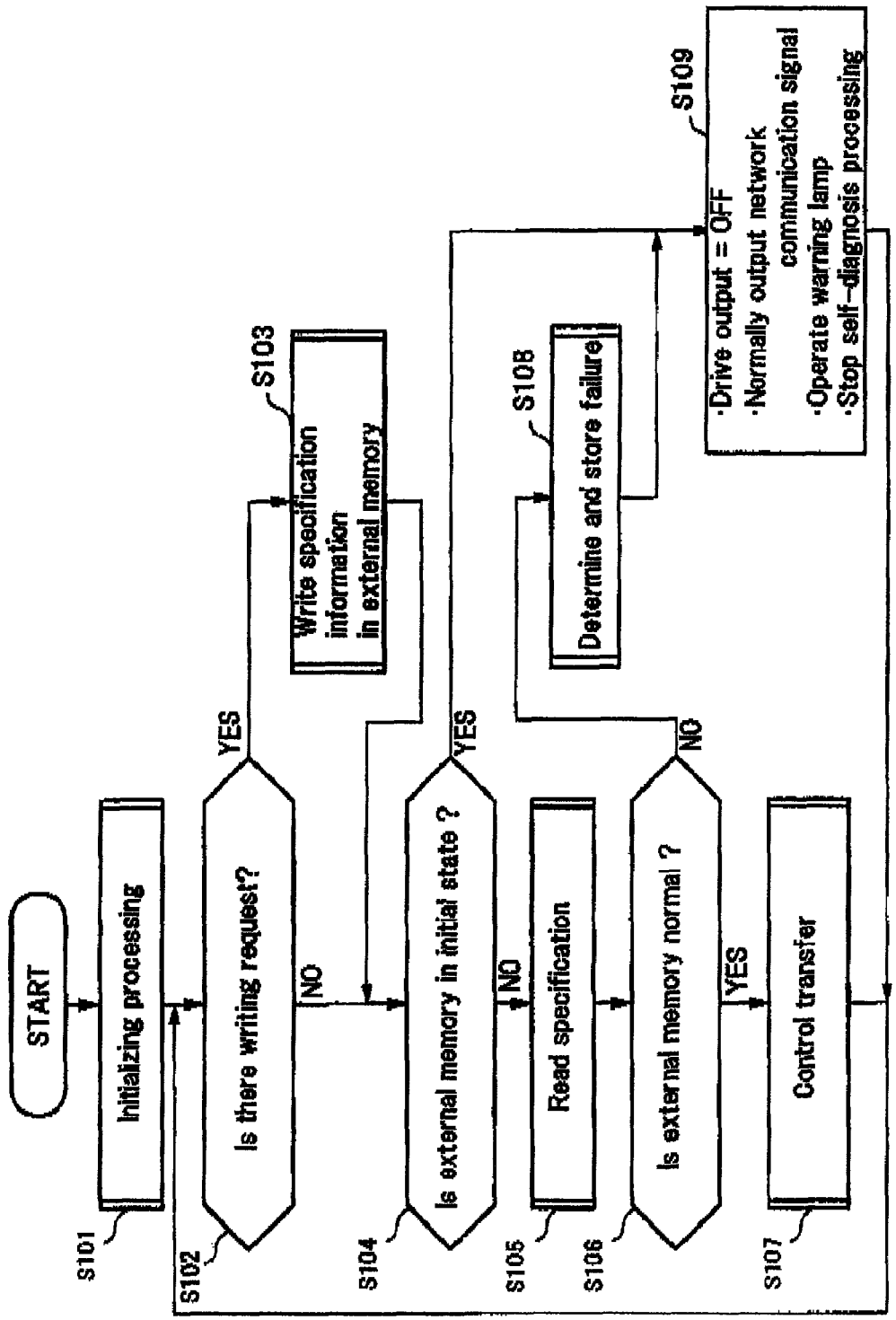
FIG. 3 is a flowchart showing a process before specification is specified according to the embodiment of the invention.

Hence, in this embodiment, processing in TF-ECU 105 is carried out as shown in a flowchart in FIG. 3 to avoid the erroneous failure determination in a state where data for specifying a specification is not written in external memory 105e.

The flowchart in FIG. 3 is executed when power is turned ON for the entire system, and the initializing processing is executed in step S101.

In step S102, it is determined whether there is writing request of specification information from vehicle plant equipment 120.

If there is the writing request of specification information from vehicle plant equipment 120, the procedure is advanced to step S103, and designated specification information is written in external memory 105e.

When there is no writing request of specification information from vehicle plant equipment 120, the procedure is advanced to step S104 bypassing step S103.

In step S104, it is determined whether external memory 105e is in an initial state, in other words, whether it is in a state where specification information is not written (i.e., a state where date for specifying specification is left to be still unset).

When external memory 105e is not in the initial state and the specification information is written, the procedure is advanced to step S105, and specification information written in external memory 105e is read.

In next step S106, it is determined whether external memory 105e is in its normal state, based on a read data.

When the specification information is normally read and it is determined that external memory 105e is in the normal state, the procedure is advanced to step S107, control data corresponding to the specification information is read from ROM 105f and copied in the RAM, and the control of transfer 104 is executed based on the control data stored in the RAM.

If it is determined in step S104 that external memory 105e is in the initial state and the specification information is not written, the procedure is advanced to step S109 from step S104.

In the vehicle factory, after TF-ECU 105 is mounted on the vehicle, and until power is turned ON to write the specification information in external memory 105e and the writing operation is actually completed, the procedure is advanced to step S109 from step S104.

In step S109, driving output with respect to transfer 104 is fixed to an OFF state, normal output similar to that carried out when control is executed is carried out to network 115, indicator lamp 107 is lit and the self-diagnosis processing is stopped.

Examples of the signal which is output to other electronic control units 110, 111 and 112 via network 115 from TF-ECU 105 include a fixed time communication signal, a return message, a signal indicative of a result of self-diagnosis, and control data.

In step S109, the same contents as those output when the control is execute are output as the fixed time communication signal and the return message. Further, a signal indicating that a result of the self-diagnosis is normal is output, and a default value is output as the control data.

A message that specification information is not written is sent to other electronic control units 110, 111 and 112 from TF-ECU 105 through network 115, and other electronic control units 110, 111 and 112 which have received the message that specification information is not written do not request TF-ECU 105 to control transfer 104.

If the driving output to transfer 104 is fixed to the OFF state, transfer 104 is fixed to a rear wheels driving state.

Since the same output as that carried out when the control is normally executed is carried out for network 115, even if TF-ECU 105 does not carry out the normal control operation, it is possible to avoid a case in which other electronic control units 110, 111 and 112 determine that TF-ECU 105 is failed (control abnormality).

A state where normal control of the transfer is not executed because specification information is not written in TF-ECU 105 is not a control abnormality. Therefore, if other electronic control units 110, 111 and 112 determine the abnormality of TF-ECU 105 and store this information, it is necessary to clear the memory of the failure history prior to shipment from the vehicle factory.

However, if it is possible to avoid the case in which electronic control units 110, 111 and 112 determine the failure as described above, labor for clearing the memory of the failure history can be reduced, and further the operability can be improved.

Further, since indicator lamp 107 is lit, an operator in the vehicle factory can easily confirm that the writing operation of the specification information is not completed, and it is possible to prevent the writing leakage and writing failure of specification information.

When indicator lamp 107 is lit because specification information is not written in TF-ECU 105, the procedure waits until the writing operation in step S103 is completed, and then indicator lamp 107 is turned off.

Since the self-diagnosis processing in TF-ECU 105 is stopped, it is possible to avoid a state in which control can not be executed because the writing operation of specification information is not completed to be self diagnosed as failure.

In this manner, it is possible to avoid a state in which control can not be executed because the writing operation of specification information is not completed to be self diagnosed as abnormality and this result of diagnosis to be output to other electronic control units 110, 111 and 112. Further, it is possible to prevent an erroneous self-diagnosis result from being stored, and it is possible to eliminate the clearing processing of the result of self-diagnosis processing.

If it is determined that external memory 105e is failed in step S106, the procedure is advanced to step S108 and a failure determination result of external memory 105e is stored, and then, the procedure is advanced to step S109.

In this case also, the driving output with respect to transfer 104 is fixed to the OFF state, and transfer 104 is fixed to the rear wheels driving state.

The same normal output as that executed when the control of the transfer is executed is carried out with respect to network 115. Therefore, the control of the transfer is stopped due to the failure of external memory 105e, and it is possible to prevent other electronic control units 110, 111 and 112 from determining the failure (control abnormality) of TF-ECU 105.

By the lighting of indicator lamp 107, it is possible to easily recognize a state in which specification information is not written, and a state in which specification information can not be read and transfer 104 can not be controlled normally.

When indicator lamp 107 is lit because it is determined that external memory 105e is failed, indicator lamp 107 is turned off when it becomes possible to read specification information from external memory 105e.

In a vehicle factory or a maintenance factory, it is possible to distinguish whether specification information is not written or specification information can not be read due to failure of external memory 105e based on the memory of the failure history in external memory 105e.

Therefore, in the vehicle factory or the maintenance factory, TF-ECU 105 or external memory 105e is reliably replaced by a new one so that specification information can be written or read and then, the specification information is again written so that the transfer can normally be controlled.

When external memory 105e is failed during usage by a user and thus specification information can not be read and transfer 104 is fixed to the rear wheels driving state, a user is informed of a fact that transfer 104 is fixed to the rear wheels driving state by means of lighting of indicator lamp 107. Therefore, it is possible to avoid a case in which a user misunderstands that distribution control of driving force is normally carried out and the user drives, and it is possible to urge the user to carry out maintenance early.

In the embodiment, TF-ECU 105 commonly uses the plurality of specifications depending on specification as the specification-by-specification electronic control unit, but any of other electronic control units 110, 111 and 112 can be used as the specification-by-specification electronic control unit.

Alternatively, some of the plurality of electronic control units may be used as the specification-by-specification electronic control units.

The electronic control unit connected to network 115 is not limited to TF-ECU 105, ENG-ECU 110, AT-ECU 111 and ABS-ECU 112, an electronic control unit which controls a driving operation of a fuel pump, and an electronic control unit which controls display of a meter provided on an instrument panel may be included, and such an electronic control unit can be used as the specification-by-specification electronic control unit.

In this embodiment, indicator lamp 107 is used as the warning means for informing a user of be fact that specification information is not written in external memory 105e or the fact that external memory 105e is failed. Alternatively, a buzzer, a voice guide, an operation lamp provided on a case of the electronic control unit, or a display on a diagnosis tool screen can be used as the warning means.

When specification information is extinguished even if the external memory 105e is in a normal state after the specification information is written in the external memory 105e, it is preferable that the other electronic control units are informed of this abnormal condition to allow them to determine abnormality and store an abnormality determination result.

It is possible to write, in external memory 105e, control data corresponding to a specific specification from vehicle plant equipment 120, to copy the control data written in external memory 105e in the RAM, and to execute the control using the control data copied in the RAM. In this case also, in a state where control data corresponding to the specific specification is not written in external memory 105e, if the same procedure as that in step S109 is carried out, the same effect can be obtained.

The entire contents of Japanese Patent Application No. 2006-299530, filed Nov. 2, 2006 are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

I claim:

1. A vehicular electronic control apparatus in which at least a portion of control data necessary for operation of the control apparatus has been omitted in its manufactured state, and which permits control data that correspond to a particular vehicle specification that is applicable for a vehicle in which the control apparatus is installed to be entered subsequent to manufacture of said control apparatus, said control apparatus comprising:
   a self-diagnosing unit for executing a self diagnosis of an abnormality; and
   a communications component for transmitting a result of a self diagnosis obtained by the self diagnosing unit to an outside of the vehicular electronic control apparatus;
   wherein the vehicular electronic control apparatus is configured to prevent transmission to the outside of a self diagnosis indicating an abnormality which is attributable to the circumstance that control data corresponding to the particular vehicle specification have not yet been entered into the control apparatus.

2. The vehicular electronic control apparatus according to claim 1, further comprising a warning function that is operable when the control data corresponding to the particular vehicle specification have not been entered.

3. The vehicular electronic control apparatus according to claim 1, wherein control data corresponding to the particular vehicle specification are entered by receiving them from a source outside of the vehicular electronic control apparatus.

4. The vehicular electronic control apparatus according to claim 1, wherein a setting of the control data that correspond to the particular vehicle specification are entered by storing a plurality of control data sets that correspond respectively to a plurality of specifications at the of production of the apparatus, and designating thereafter the particular vehicle specification, from the outside.

5. The vehicular electronic control apparatus according to claim 1, wherein:
   when control data that correspond to the particular vehicle specification have not yet been entered, a communication signal is output to the outside; and
   said communication signal has the same content as when the control data corresponding to the particular vehicle specification are entered.

6. The vehicular electronic control apparatus according to claim 1, wherein, when control data that correspond to the particular vehicle specification have not yet been entered, a return message with is outputted, said return message having the same content as the return message when control data that correspond to the particular vehicle specification are entered.

7. The vehicular electronic control apparatus according to claim 1, wherein when control data that correspond to the particular vehicle specification have not yet been entered a signal indicating that a self diagnosis is normal is output.

8. The vehicular electronic control apparatus according to claim 1, wherein when control data that correspond to the particular vehicle specification have not yet been entered, control data are output which are set to a default value.

9. The vehicular electronic control apparatus according to claim 1, wherein a signal indicating that control data that correspond to the particular vehicle specification have not yet been entered is outputted to the outside.

10. The vehicular electronic control apparatus according to claim 1, wherein when the control data that correspond to the particular vehicle specification have not yet been entered, a control signal which is outputted to the outside is fixed to an OFF state.

11. A method for entering a control specification for a vehicular electronic control apparatus that includes a self diagnosing unit for executing a self diagnosis of an abnormality, and a communications component for transmitting a result of a diagnosis obtained by the self diagnosing unit to an outside of the vehicular electronic control apparatus, the method comprising the steps of:
   manufacturing the vehicular electronic control apparatus with at least a portion of control data for operation of the control apparatus omitted;
   entering control data that correspond to a particular vehicle specification that is applicable for a vehicle in which the control apparatus is installed, after completion of said manufacturing; and
   preventing transmission of a self diagnosis indicating occurrence of an abnormality when control data that correspond to the particular vehicle specification have not yet been entered.

12. The method according to claim 11, further comprising:
   outputting a warning operation signal for warning when control data that correspond to the particular vehicle specification have not yet been entered.

13. The method according to claim 11, wherein the step of setting the control data that correspond to the particular vehicle specification comprises receiving the control data that correspond to the particular vehicle specification from outside of the vehicular electronic control apparatus.

14. The method according to claim 11, wherein:
   the step of manufacturing the vehicular electronic control apparatus with at least a portion of control data omitted comprises storing beforehand a plurality of control data sets that correspond to a plurality of vehicle specifications; and entering the control data that correspond to the particular vehicle specification comprises (i) receiving data that specify a particular vehicle specification from the outside; and (ii) selecting from among the plurality of control data sets a control data set that corresponds to the particular vehicle specification, based on the received data which specify the particular vehicle specification.

15. The method according to claim 11, further comprising: when the control data that correspond to the particular vehicle specification have not yet been entered, outputting a fixed time communication signal having the same content as when the control data that correspond to the particular vehicle specification have been entered.

16. The method according to claim 11, further comprising: when the control data that correspond to the particular vehicle specification have not yet been entered, outputting a return message to the outside with the same content as when the control data that correspond to the particular vehicle specification have been entered.

17. The method according to claim 11, further comprising: outputting a signal indicating that a self diagnosis result is normal when the control data that correspond to the particular vehicle specification has not yet been entered.

18. The method according to claim 11, further comprising: when the control data that corresponds to the particular vehicle specification have not yet been entered, outputting control data which are set to a default value.

19. The method according to claim 11, further comprising: outputting a signal indicating that the control data that correspond to the particular vehicle specification have not yet been entered.

20. The method according to claim 11, further comprising: when the control data that correspond to the particular vehicle specification have not yet been entered, setting an output control signal to an off state.

* * * * *